(12) United States Patent
Anstey et al.

(10) Patent No.: US 6,449,936 B1
(45) Date of Patent: Sep. 17, 2002

(54) PICK-UP FLOATATION SUSPENSION

(75) Inventors: Henry Dennis Anstey; Daniel Eric Derscheid; Roger William Frimml, all of Ottumwa, IA (US); Manfred Engel, Grossteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/594,251

(22) Filed: Jun. 15, 2000

(51) Int. Cl.⁷ .............................................. A01D 89/00
(52) U.S. Cl. ........................................... 56/341; 56/364
(58) Field of Search .................... 56/341, 343, 364; 100/88, 89

(56) References Cited

U.S. PATENT DOCUMENTS

| | | | | |
|---|---|---|---|---|
| 2,757,602 A | * | 8/1956 | Nolt | 56/341 |
| 2,839,981 A | * | 6/1958 | Harstick et al. | 56/341 |
| 3,798,885 A | * | 3/1974 | Glass et al. | 56/364 |
| 3,939,631 A | * | 2/1976 | Blanshine | 56/341 |
| 4,085,571 A | * | 4/1978 | Mortier et al. | 56/208 |
| 4,187,666 A | * | 2/1980 | McIlwain | 56/341 |
| 5,916,116 A | * | 6/1999 | Vande Ryse et al. | 56/341 |
| 6,212,865 B1 | * | 4/2001 | Peeters et al. | 56/366 |

* cited by examiner

*Primary Examiner*—Thomas B. Will
*Assistant Examiner*—Nathan Mammen

(57) ABSTRACT

A wide pick-up of a large round baler is mounted for floating or pivoting vertically about the axis of rotation of a rotary secondary conveyor that includes a pair of centering augers at its opposite ends. Provided at each side of the pick-up is a float spring assembly including a coil tension spring and an L-shaped link. Each coil tension spring has its upper end coupled to the baler main frame by a bracket receiving a rod joined to a spring end retainer, and has its lower end defined by a hook which is received in a hole provided in an upper end of the L-shaped link. The lower end of the link is defined by a short leg which projects forwardly beneath lower rear structure of the pick-up frame and contains a kidney-shaped aperture in which a cylindrical coupler is received, the coupler being fixed to a side member of the pick-up frame. The side members of the pick-up frame extend upward and rearward beside respective inner ends of the centering augers and respectively carry the coupling which pivotally mounts the pick-up frame for pivoting about the axis of rotation of the secondary conveyor. A pan structure includes separate front and rear sections with a lower rear portion of the front section forming a gap with the rear section and being oriented so that it retains small crop pieces during normal operation and so that crop pieces slide through and water drains through the gap when the pick-up is in its raised transport position.

6 Claims, 3 Drawing Sheets

US 6,449,936 B1

PICK-UP FLOATATION SUSPENSION

BACKGROUND OF THE INVENTION

The geometry of the linkages currently used for suspending the windrow pick-up on a known cylindrical baler having a wide pick-up overloads the system resulting in premature wear of components. Additionally, the cantilevered method of mounting the pick-up to the baler creates large moments when the wide pick-up is used with secondary augers, which add weight to the system. Due to this large mass, the pick-up flotation is difficult to control, resulting in the pick-up "hopping" during operation. Also, the windrow pick-up mechanism is very heavy to lift manually when service is required.

SUMMARY OF THE INVENTION

According to the present invention, there is provided an improved pick-up float suspension.

An object of the invention is to provide an improved suspension for permitting a crop pick-up to undergo a controlled float during operation.

A more specific object is to provide a pick-up which is suspended so as to undergo floatation during operation and wherein a float spring assembly is so located and arranged that it imposes a substantially constant lifting force on the pick-up throughout its vertical movement.

Still a more specific object is to provide a wide pick-up, for use with a large round baler, which is used together with an intermediate conveyor including centering augers mounted for rotation about a horizontal transverse axis located behind the pick-up wherein the pick-up is mounted for pivoting vertically about the transverse axis.

These and other objects will become apparent from a reading of the ensuing description together with the appended drawings.

DESCRIPTION OF THE PREFERRED EMBODIMENT

Figure 1:
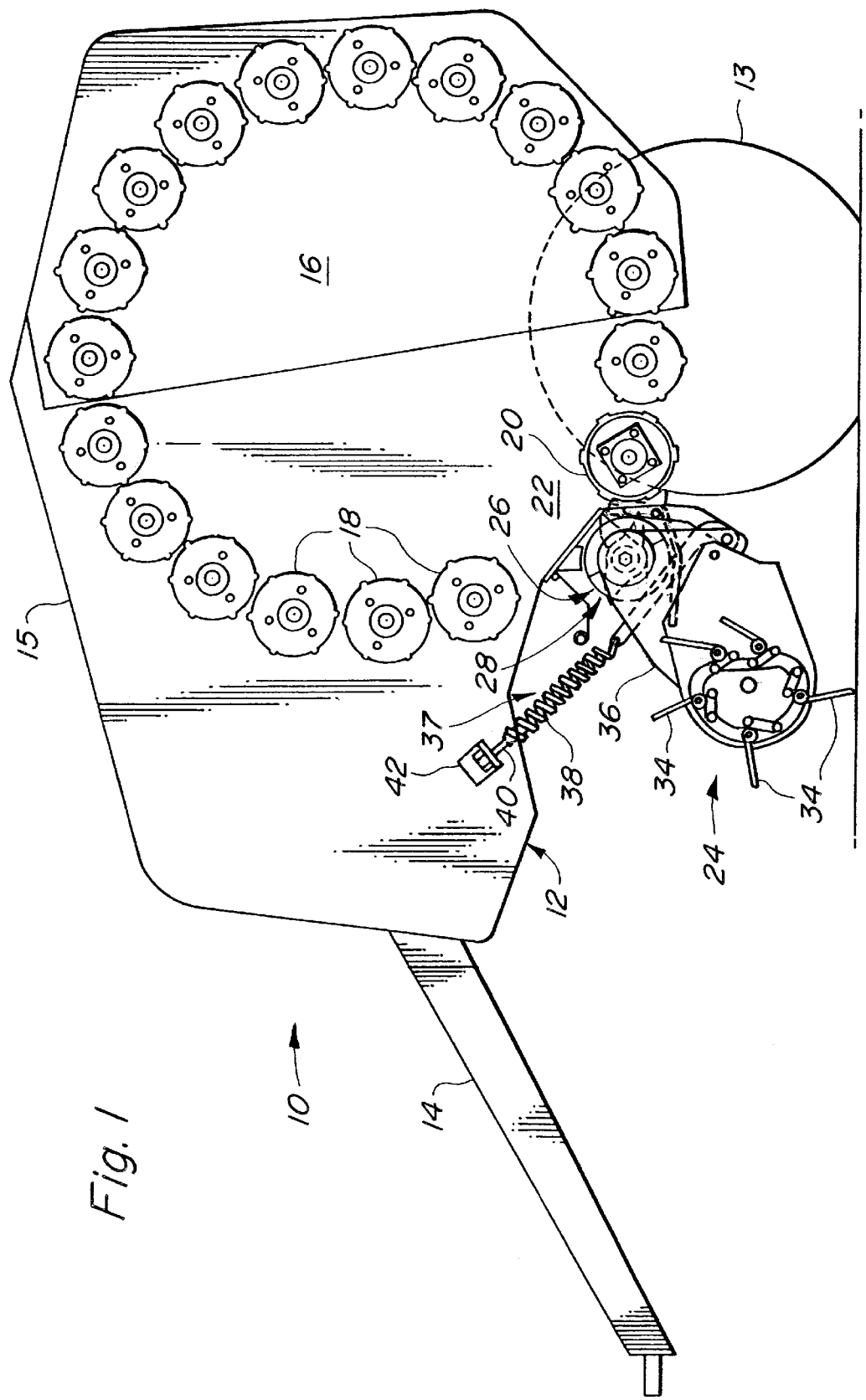
FIG. 1 is a somewhat schematic left side elevational view of a baler equipped with a wide pick-up and secondary conveyor.

Referring now to FIG. 1, there is shown a baler 10 for making large cylindrical bales.

The baler 10 includes a main frame 12 supported on ground wheels 13 and having a tongue 14 joined to the front thereof for being coupled to a towing vehicle such as an agricultural tractor, not shown, for example. The frame 12 includes opposite side walls 15 having a plurality of bale-forming rolls extending between them and supported for rotation. The bale-forming rolls are arranged in a substantially circular pattern and cooperate with the side walls 15 to define a fixed diameter baling chamber 16. Most of the bale-forming rolls are equal diameter rolls 18 with one roll being a floor roll 20, which is larger in diameter than the rolls 18 and is spaced from a lower forward one of the rolls 18 to define a baling chamber inlet 22. It will become apparent from the following that the present invention could just as well be applied to a large round baler having an expansible baling chamber, or, in fact, could find utility with other agricultural implements which process windrowed crop.

Figure 2:
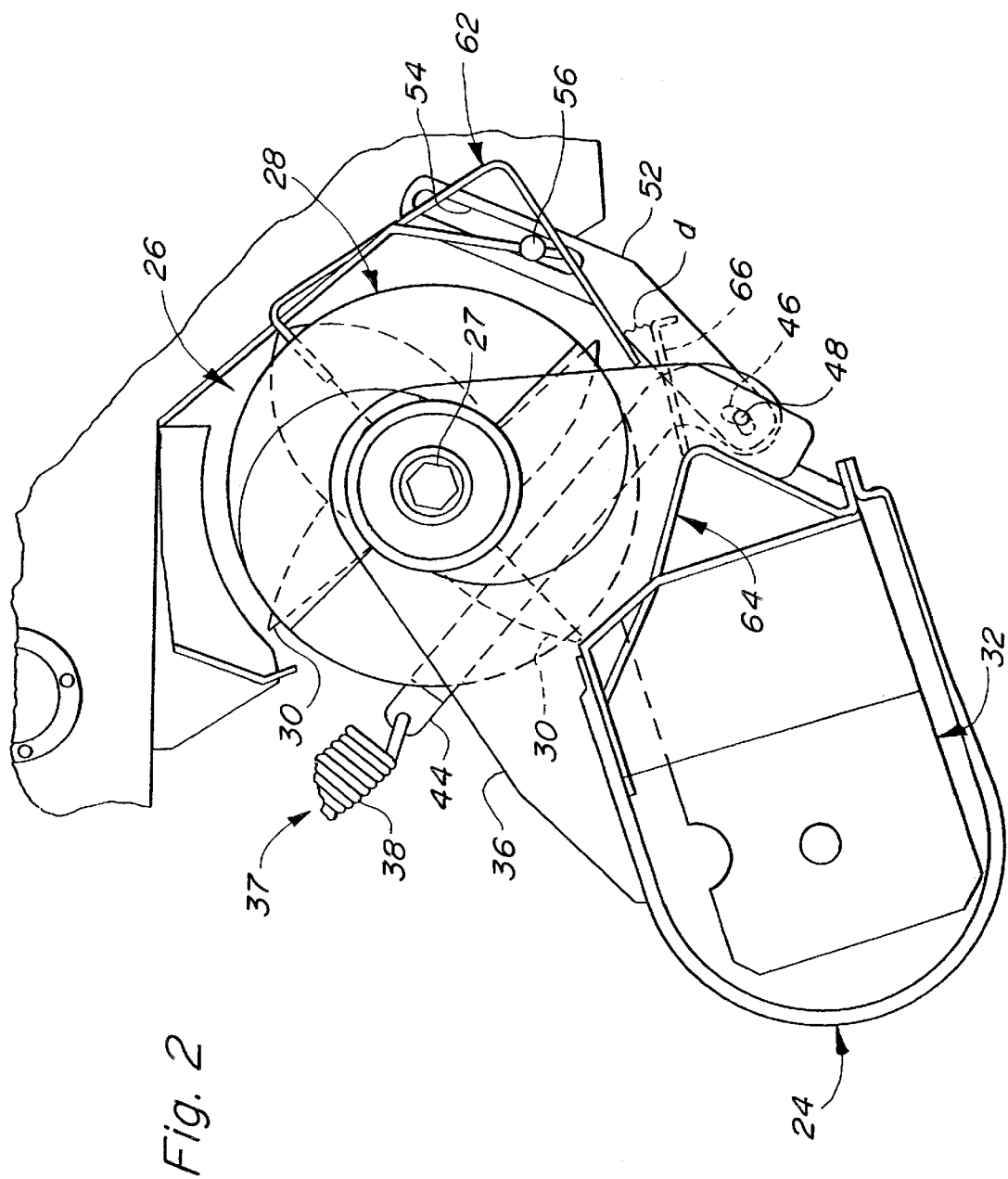
FIG. 2 is a left side elevational view of the pick-up frame and the secondary conveyor support structure together with the float spring assembly.

Mounted to the forward part of the frame 12 for picking up windrowed crop and conveying it to the baling chamber inlet 22 is a pick-up 24 and a secondary conveyor 26. The pick-up 24 is a so-called wide pick-up having a width which is greater than that of the baling chamber 16, and, for narrowing the stream of crop to the width of the baling chamber before the crop reaches the inlet 22, the secondary conveyor 26 is equipped with right- and left-hand centering augers, of which only the left-hand auger 28 is shown. Referring now also to FIG. 2, it can be seen that a plurality of rigid feed fingers 30 are mounted in transversely spaced relationship to each other between the centering augers.

The pick-up 24 includes a pick-up frame 32 supporting a tine reel including a plurality of spring tooth tines 34 that pick up windrowed crop and deliver the crop stream rearwardly to the secondary conveyor 26. The pick-up frame 32 includes transversely spaced, upright side members 36 that extend upwardly and rearwardly and are mounted for establishing a pivotal connection permitting the pick-up 24 to float vertically about the rotational axis of the crop centering augers and feed fingers 30.

Figure 3:
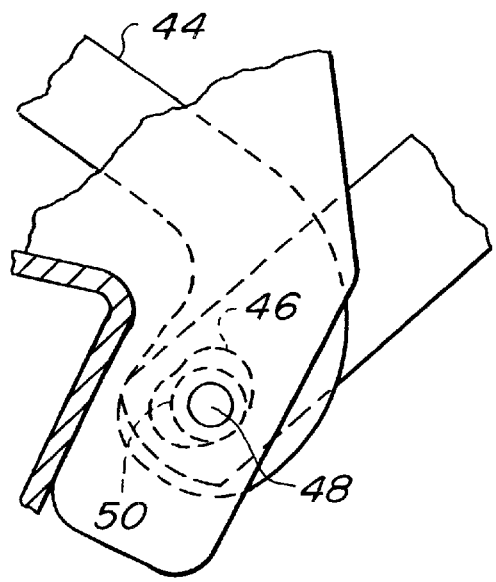
FIG. 3 is an enlarged view showing the pivotal connection between the float suspension link and the pick-up frame.

The majority of the weight of the pick-up 24 is supported by a pair of float spring arrangements 37 that are substantially identical, with only the left-hand arrangement being shown. The float spring arrangements 37 each include a coil extension spring 38 having its upper end coupled to a spring end retainer 40 carried by a bracket 42 coupled to the frame 12. The lower end of the spring 38 ends in a hook that is received in a hole provided in the top of a long leg of an L-shaped link 44, constructed from a flat strap. The long leg of the link 44 extends behind the pick-up frame 32, at a location outside the main frame wall supporting the drive shaft of the left-hand crop centering auger 28, and beside the left side member 36. Referring now also to FIG. 3, it can be seen that the link 44 has a forwardly projecting, short lower end containing a kidney shaped aperture 46 having an arcuate surface formed approximately at a radius about the hole in which the spring end hook is received. Fixed to the side member 36 is a mounting pin 48 carrying a tightly clamped cylindrical coupler 50 that is received in the kidney-shaped aperture 46 for movement between its opposite ends. The kidney-shaped aperture 46 is oriented so as to permit the cylindrical coupler 50 to move along the aperture 46 instead of being forced to pivot during float operation as the baler 10 travels over uneven terrain. It is significant that the aperture 46 and coupler 50 are located to the rear underside of the pick-up 24 since the operating environment there is relatively clean which also contributes to free movement of the coupler within the aperture 46, such free movement reducing wear on the joined parts. Provided so as to define a positive up-stop for the pick-up 24 is a stop link 52 having a forward end pivotally received on the roller axle 46 and having a rear portion provided with an elongate aperture or slot 54 received on a pin 56 fixed to the frame 12. When the pick-up 24 pivots upward, the bushing 56 travels toward a rear end of the slot 54.

It is here noted that the centering augers operate within an auger pan assembly constructed of rear and front pan sections 62 and 64, respectively, with the rear pan section 62 being joined to the frame 12 and with the front pan section 64 forming part of the pick-up frame 32. A lower rear portion 66 of the front pan section 64 overlaps and extends beneath a lower front end of the rear pan section 62 so as to permit the front pan section 64 to move freely relative to the rear pan section 62 as the pick-up 24 floats vertically. It is here noted that the front pan portion 66 is angled upward from front to rear so as to inhibit small pieces of crop from passing through a gap d formed between the pan portion 66 and the rear pan section 62 when the pick-up 24 is in its normal working range, as illustrated in FIG. 2. However, when the pick-up 24 is pivoted to a raised, transport position, the front pan portion 66 will slope downward from front to rear so as to permit water to run off and crop pieces to fall onto the ground through the gap d so as to avoid the accumulation of moisture and/or crop that would otherwise contribute to corrosion and/or crop spoilage that would increase frictional resistance to crop movement and/or pivotal movement of the pick-up 24.

Figure 4:
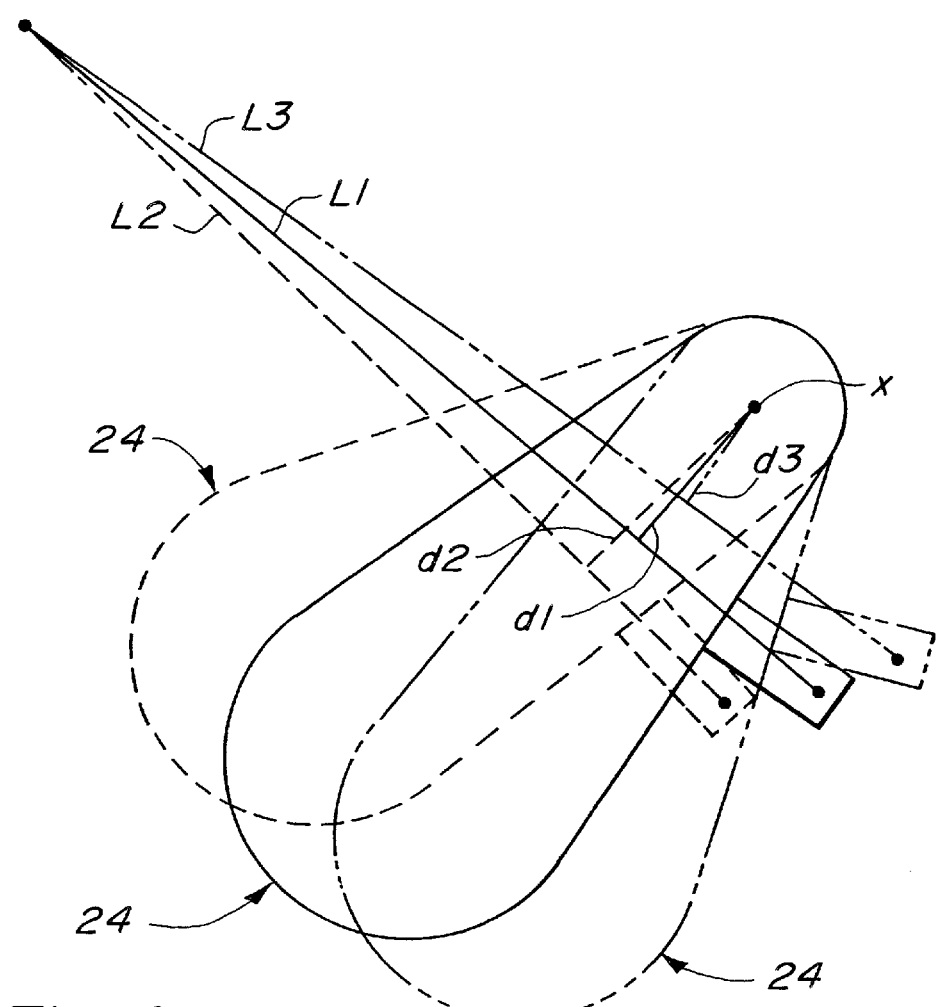
FIG. 4 is a schematic representation showing the movement through which the float spring assembly moves during floatation and its relationship to the pivotal axis of the pick-up.

Referring now to FIG. 4, the pick-up 24 is shown schematically in various positions about an axis X which is defined by the rotor shaft 27 of the secondary conveyor 26. Specifically, the pick-up 24 is shown in solid lines in an intermediate working position, in dashed lines in a fully elevated transport position and in broken lines in a lower working position. It can be seen that when the pick-up 24 is in its intermediate working position that the line of action of the spring assembly lies along a line L1 which makes a moment arm distance of d1 from the pivot axis X. The spring 38 would then be in an intermediate amount of stretch so as to exert an intermediate amount of force. As the pick-up 24 pivots up towards its transport position, the spring 38 becomes more and more collapsed so as to exert less and less force on the pick-up 24. At the same time, the moment arm increases toward a maximum moment arm d2 which is the case when the pick-up reaches its transport position. On the other hand, as the pick-up 24 pivots down from its intermediate position, the spring 38 becomes increasingly stretched so as to increase its lifting force on the pick-up 24, the spring 38 having a line of action L3 when the pick-up is in its lowest position. At the same time, the moment arm decreases toward a minimum moment arm d3 which is the case when the pick-up reaches its lower most position. The geometrical relationship of the points of attachment of the spring assembly 37 to the pivot axis X is chosen so as to cause the lifting force exerted by the spring assembly 37 on the pick-up 24 to counterbalance substantially all of the weight of the pick-up 24 acting about the axis X and to remain substantially constant throughout the range of float movement of the pick-up. Of course, those skilled in the art will understand that the float characteristics may be modified, for example, by varying force on either or both sides of the pick-up or by changing the linkage geometry.

What is claimed is:

1. In an agricultural implement including a main frame and a pick-up mounted to a forward portion of the main frame for elevating a windrow of crop and moving it to the rear for further processing, the improvement comprising: said pick-up including a pick-up frame supporting a tine reel for revolving about a transverse rotation axis; a pivotal mounting coupling said pick-up frame to said main frame for floating vertically about a transverse pivot axis; a float spring assembly coupled between said main frame and said pick-up frame in such relationship to said pivot axis that the float spring assembly acts along a line of action extending substantially perpendicular to a line of centers passing through said rotation axis and said pivot axis so as to counterbalance a major portion of the weight of said pick-up throughout an entire range of float movement of said pick-up; said float spring assembly including a spring and a link, with said spring being operatively coupled between said main frame and said link; and a pivot assembly connecting a lower end of said link to a lower rear location of said pick-up frame, whereby said pivot assembly is located in a relatively clean working environment.

2. The agricultural machine defined in claim 1 wherein said spring of said spring assembly is a coil extension spring having an upper end anchored directly to said main frame and a lower end coupled directly to an upper end of said link.

3. In an agricultural implement including a main frame and a pick-up mounted to a forward portion of the main frame for elevating a windrow of crop and moving it to the rear for further processing, the improvement comprising: said pick-up including a pick-up frame; a pivotal mounting coupling said pick-up frame to said main frame for floating vertically about a transverse pivot axis; a float spring assembly coupled between said main frame and said pick-up frame in such relationship to said pivot axis that the float spring assembly acts to counterbalance a major portion of the weight of said pick-up throughout an entire range of float movement of said pick-up; said float spring assembly including a spring and a link, with said spring being operatively coupled between said main frame and said link; a pivot assembly connecting a lower end of said link to a lower rear location of said pick-up frame; said pivot assembly including a kidney-shaped aperture formed in said pick-up frame; and a roller being mounted to said link and received in said aperture, whereby said pivot assembly is located in a relatively clean working environment and pivotal movement at said pivot assembly remains relatively free for various attitudes of operation of said pick-up as it travels over uneven terrain during operation.

4. In an agricultural implement including a main frame and a pick-up mounted to a forward portion of the main frame for elevating a windrow of crop and moving it to the rear for further processing, the improvement comprising: said pick-up including a pick-up frame; a pivotal mounting coupling said pick-up frame to said main frame for floating vertically about a transverse pivot axis; a float spring assembly coupled between said main frame and said pick-up frame in such relationship to said pivot axis that the float spring assembly acts to counterbalance a major portion of the weight of said pick-up throughout an entire range of float movement of said pick-up; said float spring assembly including a spring and a link, with said spring being operatively coupled between said main frame and said link; and a pivot assembly connecting a lower end of said link to a lower rear location of said pick-up frame; said implement being a large round baler having a baling chamber of a given width; said pick-up being a wide pick-up having a width greater than said given width; a rotary secondary conveyor having a shaft mounted to respective side walls of said main frame for rotation about said pivot axis and including right-and left-hand augers for narrowing a stream of crop delivered to said baling chamber; said pick-up frame including a pair of upward and rearward extending side members having respective rear ends located just outward of said respective side walls supporting said shaft of said rotary conveyor; and said pivotal mounting being associated with said side members of said pick-up frame.

5. The agricultural implement defined in claim 4 wherein said rotary conveyor includes a pan structure extending transversely beneath rotary members of said rotary conveyor and including a rear section carried by said baler frame and a front section carried by said pick-up frame; said front section of said pan structure including a lower rear portion which overlaps a lower front portion of said rear section and forms a gap therewith; and said front portion being oriented such that it is inclined upward from front to rear when the pick-up is in a range of working positions so that small pieces of crop material is not lost through said gap, and such that it slopes downward from front to rear when the pick-up is in its raised transport position so that crop material falls and water drains through said gap so that corrosion and/or spoiled crop conditions are prevented which would increase the frictional resistance to floatation and/or movement of crop along the pan structure.

6. In an agricultural implement including a main frame and a pick-up mounted to a forward portion of the main frame for elevating a windrow of crop and moving it to the rear for further processing, the improvement comprising: said pick-up including a pick-up frame; a pivotal mounting coupling said pick-up frame to said main frame for floating vertically about a transverse pivot axis; a float spring assembly coupled between said main frame and said pick-up frame in such relationship to said pivot axis that the float spring assembly acts to: counterbalance a major portion of the weight of said pick-up throughout an entire range of float movement of said pick-up; said float spring assembly including a spring and a link, with said spring being operatively coupled between said main frame and said link; and a pivot assembly connecting a lower end of said link to a lower rear location of said pick-up frame; said pick-up frame including a transverse rear structure; said link being L-shaped and having a long leg extending behind, and joined to a short leg extending beneath, said rear structure; said pivot assembly including an elongate aperture located in said lower short leg of each link and a pair of transversely spaced cylindrical members each being mounted to said pick-up frame and received in a respective one of said apertures, whereby the pivot assembly is located in a relatively clean environment during operation.

* * * * *